United States Patent [19]

Duyvesteyn et al.

[11] Patent Number: 5,176,802
[45] Date of Patent: Jan. 5, 1993

[54] TREATMENT OF COPPER SULFIDE CONCENTRATES

[75] Inventors: Willem P. C. Duyvesteyn, 6044 Dial Way, San Jose, Calif. 95129; Robert N. Hickman, Las Condes, Chile

[73] Assignee: Willem P. C. Duyvesteyn, Sunnyvale, Calif.

[21] Appl. No.: 732,644

[22] Filed: Jul. 19, 1991

[51] Int. Cl.⁵ .............................................. C25C 1/12
[52] U.S. Cl. .................................. 204/106; 204/107; 204/108; 423/24; 423/32; 423/33; 423/48; 423/578 A
[58] Field of Search ............... 204/106, 108, 107; 423/24, 32, 33, 48, 578 A

[56] References Cited

U.S. PATENT DOCUMENTS

| | | | |
|---|---|---|---|
| 4,022,866 | 5/1977 | Kuhn et al. | 423/26 |
| 4,030,917 | 6/1977 | Fonseca | 204/106 |
| 4,127,639 | 11/1978 | Piret et al. | 423/42 |

Primary Examiner—John Niebling
Assistant Examiner—David G. Ryser
Attorney, Agent, or Firm—Hopgood, Calimafde, Kalil, Blaustein & Judlowe

[57] ABSTRACT

A hydrometallurgical method is provided for recovering copper from particulate copper sulfide flotation concentrate containing at least about 20% copper by weight as cuprous and cupric sulfide, a significant portion of the copper in the copper sulfide concentrate being in the cuprous state. The flotation concentrate in the finely divided state is subjected to leaching with an alkaline solution of ammonia plus ammonium sulfate at a temperature ranging from about 10° C. to 95° C., preferably about 20° C. to 40° C. the amount of concentrate being proportioned at least stoichiometrically to the ammonia concentration of the leaching solution. The sulfide concentrate is leached under substantially ambient pressure while continuously aerating the solution for a time at least sufficient to dissolve the cuprous copper and oxidize it to the cupric state while avoiding or substantially minimizing the oxidation of cupric sulfide to sulfate, and thereby obtain a filtrate containing at least about 15% of the total amount of copper in the concentrate and provide a washed residue containing at least about 20% copper by weight comprised substantially of cupric sulfide.

18 Claims, 7 Drawing Sheets

5,176,802

TREATMENT OF COPPER SULFIDE CONCENTRATES

This invention relates to a hydrometallurgical method for recovering copper from particulate copper sulfide flotation concentrate containing at least about 20% by weight copper, a significant portion of the copper in the copper sulfide concentrate being in the cuprous or monovalent state.

STATE OF THE ART

It is known to recover copper from copper sulfide concentrates by hydrometallurgical methods.

U.S. Pat. No. 3,985,555 discloses a method for the acid dissolution of chalcopyrite in which the dissolved copper is produced as metallic copper by the addition of a metal reductant, such as iron or lead, while converting a major portion of the combined sulfur to gaseous hydrogen sulfide. A disadvantage of this process is the environmental problem of dealing with hydrogen sulfide.

U.S. Pat. No. 4,022,866 in the names of Kuhn and Arbiter relates to the treatment of a sulfide concentrate containing copper together with nickel and zinc, wherein the concentrate is leached with a solution comprised of ammonia and ammonium sulfate at a temperature of 50° to 80° C. at an over-pressure below 10 psi in the presence of free oxygen while vigorously recirculating the oxygen from above the surface of the mixture to a substantial depth below the surface. Additional sulfate ions are formed by virtue of the oxidation of sulfide sulfur which must be removed. The undissolved sulfidic residue is subjected to a secondary flotation operation to produce a sulfide concentrate containing metal values, i.e., copper, which may be treated by smelting or by further releaching.

A disadvantage of this process is the build up of sulfate ion in the circuit which must be removed to enable recycling of the leaching solution.

The Arbiter et al U.S. Pat. No. 4,153,522 which apparently stems from similar work relating to the above-identified U.S. Pat. No. 4,022,866 is also directed to the use of ammonia/ammonium sulfate solution in the leaching of copper sulfide concentrates using free oxygen. As in U.S. Pat. No. 4,022,866, sulfide sulfur is oxidized to the sulfate. The sulfate ion is thereafter removed in a separate step by the addition of lime to form the insoluble compound gypsum in order to avoid the build-up of the sulfate ion in the recycled leach solution.

U.S. Pat. No. 4,331,635 to Arbiter et al is similar to the above-identified patent and presents the same problem of sulfate ion control.

U.S. Pat. No. 4,036,639 to W. J. Yurko relates to the high pressure leaching of copper sulfide concentrates at about 77° C. and a partial oxygen pressure of 100 psig. In this patent, the sulfide sulfur is oxidized to the sulfate state which must be removed using lime as the precipitant.

In all of the foregoing patents in which the leach solution is a mixture of ammonia and ammonium sulfate, the conditions of leaching are such, particularly with the use of free oxygen as the oxidant, that a substantial portion of the sulfide sulfur is oxidized to the sulfate state. Since this adversely affects the composition of the leach solution and hence its leaching efficiency due to the conversion of free ammonia to newly formed ammonium sulfate, the extra sulfate ions must be removed and make-up ammonia added in order to maintain the recycle leach solution within the proper composition range.

We have discovered in leaching copper sulfide concentrates containing at least about 20% by weight of copper in which a significant portion of the copper is in the cuprous state, for example, at least about 15% or 20% of the total copper present, that the cuprous copper can be selectively dissolved expeditiously and easily in the form of cupric ions by using substantially the same ammonia/ammonium sulfate leach solution under ambient conditions by merely using air as an oxidant while minimizing or substantially avoiding the oxidation of sulfide sulfur to the sulfate state.

OBJECTS OF THE INVENTION

It is an object of the invention to provide an efficient method for the atmospheric ammoniacal leaching of copper sulfide flotation concentrate under ambient conditions using air as the oxidant.

Another object is to provide method for leaching copper sulfide flotation concentrate containing significant amounts of cuprous copper using an ammoniacal solution, wherein the method employed is selective to the dissolution of cuprous copper while minimizing the oxidation of sulfide sulfur to the sulfate state and thereby conserving the free ammonia concentration in said leaching solution for recycling into the leaching circuit.

These and other objects will more clearly appear from the disclosure and the accompanying drawing.

IN THE DRAWINGS

SUMMARY OF THE INVENTION

Figure 1:
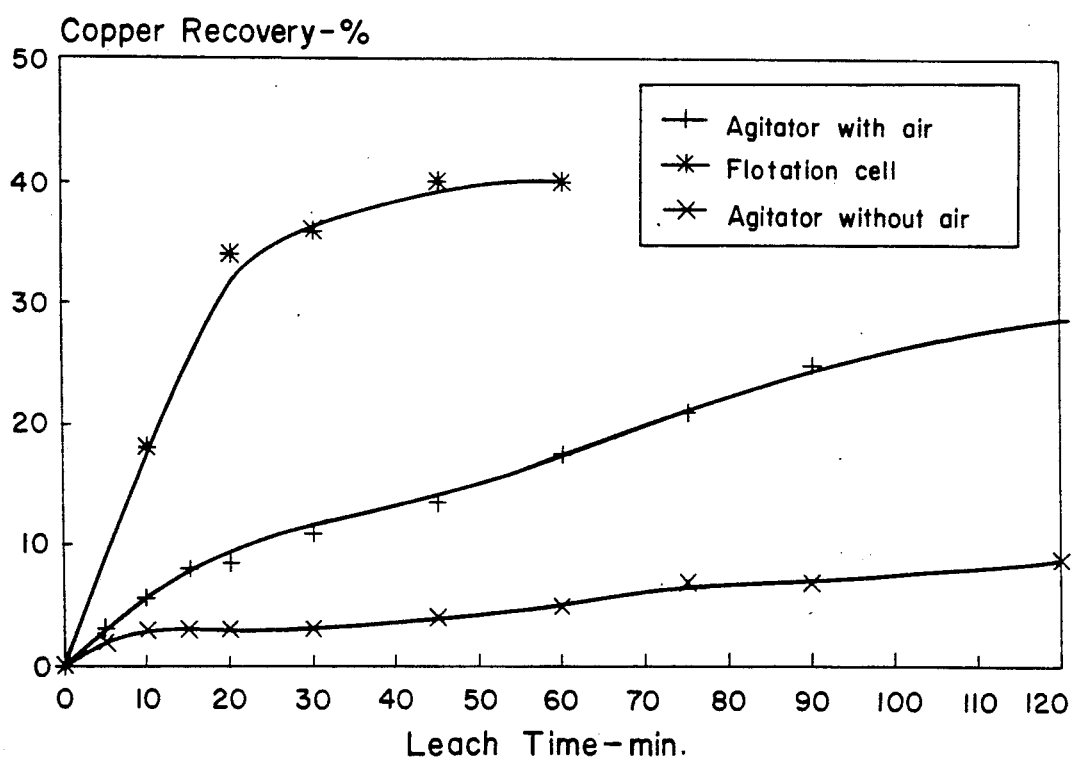
FIG. 1 depicts leaching curves demonstrating the various leaching effects obtained using certain equipment.

Stating it broadly, the invention is directed to a hydrometallurgical method comprising a leaching operation for recovering copper from particulate copper sulfide flotation concentrate containing at least about 20 or 25% copper by weight, a significant portion of the copper in the copper sulfide concentrate being in the cuprous or monovalent state, and thereby provide a copper sulfide-containing residue as a valuable intermediate.

The method comprises providing the copper sulfide flotation concentrate in the finely divided state, and subjecting a slurry of the concentrate to leaching with an alkaline solution of ammonia plus ammonium sulfate of concentration ranging from about 30 gpl to 150 gpl of ammonia and about 25 gpl to 200 gpl of ammonium sulfate at a temperature ranging from about 10° C. to 95° C., the amount of sulfide concentrate in the slurry ranging from about 25 gpl to 500 gpl proportioned at least stoichiometrically to the concentration of the leaching solution.

The sulfide concentrate is leached under substantially ambient pressure while continuously aerating the solution for a time at least sufficient to dissolve the cuprous copper and oxidize it to the cupric state while minimizing oxidation of the contained sulfide sulfur to sulfate and thereby obtain pregnant filtrate containing at least about 15% of the total amount of copper in said concentrate and provide a washed residue as a valuable intermediate containing at least about 20% copper by weight comprised substantially of cupric sulfide for use in the further recovery of copper therefrom. The copper in the leaching solution is subsequently recovered by electrowinning following solvent extraction of the copper.

A particular advantage of the foregoing process is that, unlike the prior art discussed hereinabove, the easily soluble copper is selectively removed in a very short period of time at substantially ambient temperature by using air as the oxidant in place of substantially pure oxygen. Thus, the strong oxidizing potential of free oxygen as employed in the prior art is avoided and the oxidation of sulfide sulfur to sulfate is substantially minimized, if not avoided.

In other words, the build up of sulfate ions in the ammoniacal leach solution is maintained to less than about 10%, or less than about 5% of the original sulfate ion present so that the leach solution subsequently freed of dissolved copper can be recycled without the need of removing excess sulfate ion as required in the prior art process discussed hereinbefore, thereby minmizing the need for adding make-up ammonia to the recycle leach solution.

DETAILS OF THE INVENTION

A variety of tests were conducted in which three types of copper sulfide flotation concentrates were employed, the copper sulfide concentrates being referred to as Escondida copper sulfide concentrates in which chalcocite and pyrite are the dominant sulfide minerals with minor amounts of "blaubleibende" covellite, chalcopyrite, bornite, and digenite with traces of molybdenite These Escondida concentrates are produced from ores obtained from the Escondida mines in Chile. The chalcocite occurs as free particles or as middlings with pyrites.

The three types of concentrates are referred to as concentrates 1, 2, and 3 as shown in Table 1 below.

TABLE 1

| Chemical analysis of Escondida copper sulfide concentrates | | | |
|---|---|---|---|
| Component | Concentrate 1 (6 year old) (%) | Concentrate 2 (new, batch #1) (%) | Concentrate 3 (new, batch #2) (%) |
| $Al_2O_3$ | 2.01 | 5.48 | 3.09 |
| Bi | 0.006 | <0.001 | <0.001 |
| CaO | 0.08 | 0.22 | 0.18 |
| Cd | <0.001 | <0.001 | <0.001 |
| Co | 0.002 | 0.002 | <0.001 |
| Cu | 37.6 | 34.49 | 38.50 |
| Fe | 15.30 | 11.80 | 15.60 |
| MgO | 0.09 | 0.44 | 0.16 |
| Mo | 0.22 | 0.13 | 0.12 |
| Ni | <0.001 | <0.001 | <0.001 |

TABLE 1-continued

| Chemical analysis of Escondida copper sulfide concentrates | | | |
|---|---|---|---|
| Pb | 0.04 | 0.01 | 0.01 |
| S | 27.45 | 21.11 | 28.00 |
| Sb | 0.004 | 0.002 | <0.001 |
| Se | 0.003 | 0.01 | <0.001 |
| $SiO_2$ | 5.6 | 15.23 | 9.57 |
| Te | <0.001 | <0.001 | <0.001 |
| Zn | 0.13 | 0.04 | 0.08 |
| Component | (ppm) | (ppm) | (ppm) |
| Ag | 90 | 52.1 | 53.0 |
| Au | 1.1 | 1.6 | 2.1 |

The samples that were used in the leaching experiments were: a six year old and freshly floated sulfide flotation concentrates from Escondida. The new concentrate was received in two batches. The six-year old concentrate was repulped in water to disperse the agglomerated fine particles. All the concentrates were dried at 85° C. for approximately 24 hours. Representative cuts were taken by splitting the sample several times. The results of chemical analysis for all the concentrates are shown in Table 1 above.

A screen analysis was performed on all samples using represenatative samples. The results of this analysis are shown in Table 2.

TABLE 2

| Screen analysis of Escondida copper sulfide concentrates. | | | | |
|---|---|---|---|---|
| Size | | Concentrate 1 | Concentrate 2 | Concentrate 3 |
| mesh | micron | % Passing | | |
| 100 | 149 | 100.0 | 99.0 | 97.0 |
| 150 | 105 | 99.3 | 94.7 | 86.6 |
| 200 | 74 | 95.9 | 84.0 | 71.2 |
| 270 | 53 | 86.1 | 68.8 | 55.6 |
| 325 | 44 | 78.6 | 59.6 | 47.2 |
| 400 | 37 | 71.4 | 52.2 | 40.4 |

It should be noted that the average particle size of the freshly floated concentrate was substantially larger than the older material.

To examine the distribution of copper in the different particle sizes, Concentrate 3 was chemically analyzed. The results are shown in Table 3.

TABLE 3

| Distribution of copper by particle size in Concentrate 3 | | | | |
|---|---|---|---|---|
| Size | | Weight Distribution | Copper Assay | Copper Distribution |
| mesh | micron | (%) | (%) | (%) |
| +100 | +149 | 3.0 | 17.0 | 1.4 |
| −100 + 150 | −149 + 105 | 10.4 | 24.1 | 6.7 |
| −150 + 200 | −105 + 74 | 15.4 | 29.4 | 12.0 |
| −200 + 270 | −74 + 53 | 15.6 | 34.5 | 14.3 |
| −270 + 325 | −53 + 44 | 8.4 | 37.9 | 8.5 |
| −325 + 400 | −44 + 37 | 6.7 | 42.8 | 7.6 |
| −400 | −37 | 40.4 | 46.1 | 49.5 |
| Total | | 100.0 | 37.6 | 100.0 |

Table 3 shows that copper values in Concentrate 3 are concentrated in the finer fractions.

Over twenty tests were conducted, most of the tests being carried out on the Type 3 concentrate.

The purpose of the tests was to develop a fast partial leaching of the copper values in the concentrate having as one of its objectives the control of the composition of the leaching solution to meet the demand of successive process stages. The leaching conditions should be sufficiently mild and fast to limit impurity dissolution and to minimize the capital investment and operating costs.

One of the main objects of the process is to minimize and preferably prevent the formation of side products, such as ammonium sulfate.

The chemical characteristics of the chalcocite ($Cu_2S$), the major copper sulfide mineral present in the concentrates, are such that the above-identified aims are achieved easily using air as the leaching oxidant. The leaching time is low, preferably not exceeding two hours and, more preferably, not exceeding one hour. Because of the leaching conditions, very little sulfide sulfur, if any, is oxidized to the sulfate.

A large portion of the cuprous copper of chalcocite is substantially immediately soluble and oxidized to cupric ions. The leaching kinetics of the conversion of chalcocite to covellite corresponds to a copper extraction of about 50% of said mineral, the rate being substantially much faster than the rate of the successive dissolution of covellite.

Because of the differences in leaching characteristics between chalcocite and covellite using air as the oxidant under mild conditions in the absence of substantially pure oxygen, the leaching is easily controllable to avoid or minimize oxidation of the sulfide sulfur in covellite to sulfate.

In carrying out the test program, the leaching solutions were prepared with Analyzed Reagent Grade ammonium sulfate, except for a few tests, where Technical Grade was used. Free ammonia was added to the solution in the form of Reagent Grade 30% $NH_4OH$ solution. The concentration of ammonium sulfate was varied from 40 to 150 gpl. The concentration of free ammonia ranged from about 20 and 100 gpl depending on the solids concentration in the leach solution.

The leaching tests were performed in a 1-liter reaction vessel that could be sealed with a lid having four openings. The central opening was used for the agitator. Two other openings held a condenser and an air distributor. The final opening was used for temperature control and to take samples. The suspension was agitated with a four-blade propeller that was set at approximately 600 rpm. Samples of about 10 ml were taken at certain time intervals. They were filtered using Whatman no. 1 filter paper. The small amounts of residue that were also extracted from the solution were returned to the leach reactor using a minimal amount of deionized water. The solutions were analyzed by Atomic Absorption Spectrometry or by induced Coupled Plasma. At the end of the experiment, the leach residue was filtered, again using Whatman No. 1 filter paper, and washed with deionized water. The leach residue was then dried at a temperature of around 85° C. for approximately 12 hours.

Other leach tests were performed using a Denver flotation cell. The objective was to confirm previous findings by others that the generation of a large number of small air bubbles will saturate the solution with air and, consequently, will increase the kinetics of the leach process. The sampling procedure was the same as described above.

Both previously produced and stored concentrate and the freshly floated material were used. The leaching rate of the 6-year old concentrate was several times higher than the rate of the new concentrate. Because the old concentrate was not stored wet, an explanation for this increase in reactivity could be the slow oxidation of the copper sulfide minerals during the 6 years of storage. However, mineralogical investigations did not confirm that oxidation had taken place.

The effect of the free ammonia concentration, the ammonium sulfate concentration and the particle size were investigated.

Detailed test data are given as follows:

EXAMPLE 1

Experiment Conditions

| Ammonium Sulfate (gpl) | Free Ammonia (gpl) | Volume (ml) | Solids (gpl) | Temp (°C.) | Air (lpm) | Concentrate (#) |
| --- | --- | --- | --- | --- | --- | --- |
| 80 | 45 | 500 | 250 | 25 | 5 | 2 |

Experimental Results

| | Volume (ml) | Cu-Conc (gpl) | Calculated Feed Grade (%) |
| --- | --- | --- | --- |
| Filtrate | 660 | 19.06 | |
| Wash | 615 | 0.85 | 29.4 Cu |
| Residue Weight | 103.0 gram | | |

| Residue analysis | Cu % | Fe % | S % | Zn % | Pb % | Cd % | As % |
| --- | --- | --- | --- | --- | --- | --- | --- |
| | 22.96 | 13.65 | 24.16 | — | — | — | — |

| Sample | Time (min) | Cu-Conc (gpl) (ml) | Remain. Volume | Cu-Recovery (%) |
| --- | --- | --- | --- | --- |
| 1 | 10 | 7.99 | 500.0 | 10.9 |
| 2 | 20 | 12.08 | 540.0 | 17.7 |
| 3 | 30 | 14.61 | 580.0 | 23.1 |
| 4 | 45 | 17.27 | 620.0 | 29.1 |
| 5 | 60 | 19.20 | 660.0 | 34.5 |

It will be noted that the residue yields a fairly high concentration of copper which can be used as a smelter addition or can be further upgraded by flotation.

EXAMPLE 2

Experiment Conditions

| Ammonium Sulfate (gpl) | Free Ammonia (gpl) | Volume (ml) | Solids (gpl) | Temp (°C.) | Air (lpm) | Concentrate (#) |
| --- | --- | --- | --- | --- | --- | --- |
| 80 | 45 | 1000 | 250 | 25 | 5 | 3 |

Experimental Results

| | Volume (ml) | Cu-Conc (gpl) | Calculated Feed Grade (%) |
| --- | --- | --- | --- |
| Filtrate | 1230 | 20.05 | |
| Wash | 670 | 1.20 | 36.8 Cu |
| Residue Weight | 218.5 gram | | |

| Residue analysis | Cu % | Fe % | S % | Zn % | Pb % | Cd % | As % |
| --- | --- | --- | --- | --- | --- | --- | --- |
| | 30.48 | 18.42 | 32.97 | — | — | — | — |

| Sample | Time (min) | Cu-Conc (gpl) | Remain. Volume (ml) | Cu-Recovery (%) |
| --- | --- | --- | --- | --- |
| 1 | 10 | 4.85 | 1000.0 | 5.3 |
| 2 | 20 | 7.27 | 1028.8 | 8.1 |
| 3 | 30 | 9.27 | 1057.5 | 10.6 |
| 4 | 45 | 11.18 | 1086.3 | 13.2 |
| 5 | 60 | 14.12 | 1115.0 | 17.1 |
| 6 | 75 | 16.23 | 1143.8 | 20.2 |
| 7 | 90 | 17.77 | 1172.5 | 22.6 |
| 8 | 105 | 18.11 | 1201.3 | 23.6 |
| 9 | 120 | 19.79 | 1230.0 | 26.4 |

Substantial amounts of copper were recovered while producing a high grade copper sulfide residue of 30.48 weight %, despite the fact that the feed grade contained 36.8% by weight copper. About 26.4% of the copper was recovered after 120 minutes of leaching.

Leach residue settling tests were conducted in Example 2 as follows:

| Settling Conditions and Results | | | |
|---|---|---|---|
| | | THICKENED PULP VOL: | 148 CC |
| CYL FAC: | 868 cc/ft | TESTED pH | 6.41 |
| PULP VOL: | 600 cc | COMP PT TIME: | 14 minutes |
| PULP WT: | 770.7 grams | COMP PT VOL: | 177 cc |
| ACTUAL SOLID WT: | 218.5 grams | Tx: | 25 minutes |
| Calculations | | | |
| PULP DENSITY: | 28.4% solids | | |
| CALC SG: | 4.57 | | |
| THICKENED PULP DEN: | 68.6% solids | | |
| SETTLING RATE: | 2.09 ft/HR | 0.64 m/hr | |
| INITIAL PULP HT: | 0.69 ft | 0.21 m | |
| INITIAL PULP DEN: | 0.0114 sh t/cu ft | 0.365 m t/cu m | |
| CRITICAL TIME: | 0.017 day | | |
| UNIT AREA: | 2.20 sq ft/TPD | 0.225 sq m/tpd | |
| TERMINAL DENSITY: | 62.8% solids | | |

EXAMPLE 3

Experiment Conditions

| Ammonium Sulfate (gpl) | Free Ammonia (gpl) | Volume (ml) | Solids (gpl) | Temp (°C.) | Air* (lpm) | Concentrate (#) |
|---|---|---|---|---|---|---|
| 80 | 45 | 1000 | 250 | 25 | — | 3 |

Experimental Results

| | Volume (ml) | Cu-Conc (gpl) | Calculated Feed Grade (%) |
|---|---|---|---|
| Filtrate | 1400 | 22.52 | |
| Wash | 500 | 2.06 | 31.0 Cu |
| Residue Weight | 173.4 gram | | |
| | Cu | Fe | S | Zn | Pb | Cd | As |
| Residue analysis | % | % | % | % | % | % | % |
| | 25.98 | 19.96 | 33.03 | — | — | — | — |

| Sample | Time (min) | Cu-Conc (gpl) | Remain. Volume (ml) | Cu-Recovery (%) |
|---|---|---|---|---|
| 1 | 10 | 14.15 | 1000.0 | 18.2 |
| 2 | 20 | 23.83 | 1100.8 | 33.8 |
| 3 | 30 | 23.48 | 1200.0 | 36.3 |
| 4 | 45 | 23.75 | 1300.0 | 39.8 |
| 5 | 60 | 21.98 | 1400.0 | 39.7 |

*Flotation cell used.

At the end of 60 minutes, 39.7% of the copper was recovered while providing a high grade residue containing 25.98% copper by weight. The leaching temperature was relatively low, i.e., 25° C.

The leaching residue settling results of Example 3 are given below:

| Settling Conditions and Results | | | |
|---|---|---|---|
| | | THICKENED PULP VOL: | 131 CC |
| CYL FAC: | 855 cc/ft | TESTED pH | 6.83 |
| PULP VOL: | 500 cc | COMP PT TIME: | 20 minutes |
| PULP WT: | 633.4 grams | COMP PT VOL: | 173 cc |
| ACTUAL SOLID WT: | 171.6 grams | Tx: | 35 minutes |
| Calculations | | | |
| PULP DENSITY: | 27.1% solids | | |
| CALC SG: | 4.49 | | |
| THICKENED PULP DEN: | 64.9% solids | | |
| SETTLING RATE: | 1.15 ft/HR | 0.35 m/hr | |
| INITIAL PULP HT: | 0.58 ft | 0.18 m | |
| INITIAL PULP DEN: | 0.0107 sh t/cu ft | 0.344 m t/cu m | |
| CRITICAL TIME: | 0.024 day | | |
| UNIT AREA: | 3.87 sq ft/TPD | 0.395 sq m/tpd | |
| TERMINAL DENSITY: | 56.0% solids | | |

EXAMPLE 4

Experiment Conditions

| Ammonium Sulfate (gpl) | Free Ammonia (gpl) | Volume (ml) | Solids (gpl) | Temp (°C.) | Air (lpm) | Concentrate (#) |
|---|---|---|---|---|---|---|
| 80 | 45 | 500 | 250 | 25 | 5 | 3 |

Experimental Results

| | Volume (ml) | Cu-Conc (gpl) | Calculated Feed Grade (%) |
|---|---|---|---|
| Filtrate | 745 | 20.53 | |
| Wash | 290 | 0.36 | 38.5 Cu |
| Residue Weight | 105.3 gram | | |
| | Cu | Fe | S | Zn | Pb | Cd | As |
| Residue analysis | % | % | % | % | % | % | % |
| | 31.06 | 20.36 | 35.63 | — | — | — | — |

| Sample | Time (min) | Cu-Conc (gpl) | Remain. Volume (ml) | Cu-Recovery (%) |
|---|---|---|---|---|
| 1 | 5 | 3.30 | 500.0 | 3.4 |
| 2 | 10 | 5.55 | 527.2 | 6.1 |
| 3 | 15 | 7.28 | 554.4 | 8.4 |
| 4 | 20 | 7.17 | 581.7 | 8.7 |
| 5 | 30 | 8.71 | 608.9 | 11.0 |
| 6 | 45 | 10.90 | 636.1 | 14.4 |
| 7 | 60 | 13.35 | 663.3 | 18.4 |
| 8 | 75 | 15.25 | 690.6 | 21.9 |
| 9 | 90 | 18.09 | 717.8 | 27.0 |
| 10 | 120 | 20.85 | 745.0 | 32.3 |

At the end of two hours, 32.3% by weight copper was recovered at a leaching temperature of 25° C.

EXAMPLE 5

Experiment Conditions

| Ammonium Sulfate (gpl) | Free Ammonia (gpl) | Volume (ml) | Solids (gpl) | Temp (°C.) | Air (lpm) | Concentrate (#) |
|---|---|---|---|---|---|---|
| 80 | 45 | 500 | 250 | 25 | 0 | 3 |

Experimental Results

| | Volume (ml) | Cu-Conc (gpl) | Calculated Feed Grade (%) |
|---|---|---|---|
| Filtrate | 620 | 7.14 | |
| Wash | 335 | 0.38 | 38.5 Cu |

EXAMPLE 5 -continued

Residue Weight 118.2 gram

| Residue analysis | Cu % | Fe % | S % | Zn % | Pb % | Cd % | As % |
|---|---|---|---|---|---|---|---|
| | 36.82 | 17.27 | 30.62 | — | — | — | — |

| Sample | Time (min) | Cu-Conc (gpl) | Remain. Volume (ml) | Cu-Recovery (%) |
|---|---|---|---|---|
| 1 | 5 | 2.10 | 500.0 | 2.2 |
| 2 | 10 | 2.48 | 513.3 | 2.6 |
| 3 | 15 | 2.65 | 526.7 | 2.9 |
| 4 | 20 | 2.83 | 540.0 | 3.2 |
| 5 | 30 | 3.04 | 553.3 | 3.5 |
| 6 | 45 | 3.54 | 566.7 | 4.2 |
| 7 | 60 | 4.38 | 580.0 | 5.3 |
| 8 | 75 | 5.29 | 593.3 | 6.5 |
| 9 | 90 | 5.90 | 606.7 | 7.4 |
| 10 | 120 | 6.99 | 620.0 | 9.0 |

It will be noted that the amount of copper recovered was 9% after 120 minutes of leaching, when no air was used.

EXAMPLE 6

Experiment Conditions

| Ammonium Sulfate (gpl) | Free Ammonia (gpl) | Volume (ml) | Solids (gpl) | Temp (°C.) | Air* (lpm) | Concentrate (#) |
|---|---|---|---|---|---|---|
| 80 | 50 | 1000 | 100 | 35–40 | — | 3 |

Experimental Results

| | Volume (ml) | Cu-Conc (gpl) | Calculated Feed Grade (%) |
|---|---|---|---|
| Filtrate | 1430 | 28.41 | |
| Wash | 470 | 4.57 | 38.1 Cu |

Residue Weight 198.5 gram

| Residue analysis | Cu % | Fe % | S % | Zn % | Pb % | Cd % | As % |
|---|---|---|---|---|---|---|---|
| | 26.46 | 21.49 | 36.22 | 0.31 | 0.06 | <0.01 | <0.01 |

| Sample | Time (min) | Cu-Conc (gpl) | Remain. Volume (ml) | Cu-Recovery (%) |
|---|---|---|---|---|
| 1 | 2 | 4.91 | 1000.0 | 5.2 |
| 2 | 5 | 7.47 | 1047.8 | 8.2 |
| 3 | 10 | 11.73 | 1095.6 | 13.5 |
| 4 | 15 | 15.77 | 1143.3 | 18.9 |
| 5 | 30 | 25.83 | 1191.1 | 32.3 |
| 6 | 45 | 27.68 | 1238.9 | 36.0 |
| 7 | 60 | 28.46 | 1286.7 | 38.4 |
| 8 | 75 | 28.25 | 1334.4 | 39.6 |
| 9 | 90 | 28.86 | 1382.2 | 39.0 |
| 10 | 120 | 27.46 | 1430.0 | 41.2 |

*Flotation cell used.

At a temperature of 35°–40° C., the copper recovery at 60 minutes of leaching was 38.4% and 41.2% at 120 minutes.

EXAMPLE 7

Experiment Conditions

| Ammonium Sulfate (gpl) | Free Ammonia (gpl) | Volume (ml) | Solids (gpl) | Temp (°C.) | Air* (lpm) | Concentrate (#) |
|---|---|---|---|---|---|---|
| 80 | 100 | 1000 | 250 | 35–40 | — | 3 |

Experimental Results

| | Volume (ml) | Cu-Conc (gpl) | Calculated Feed Grade (%) |
|---|---|---|---|
| Filtrate | 1280 | 48.16 | |
| Wash | 505 | 4.17 | 43.4 Cu |

Residue Weight 185.0 gram

| Residue analysis | Cu % | Fe % | S % | Zn % | Pb % | Cd % | As % |
|---|---|---|---|---|---|---|---|
| | 24.21 | 25.42 | 39.60 | 0.19 | 0.12 | — | — |

| Sample | Time (min) | Cu-Conc (gpl) | Remain. Volume (ml) | Cu-Recovery (%) |
|---|---|---|---|---|
| 1 | 2 | 6.31 | 1000.0 | 5.8 |
| 2 | 5 | 9.79 | 1031.1 | 9.3 |
| 3 | 10 | 14.74 | 1062.2 | 14.4 |
| 4 | 15 | 19.96 | 1093.3 | 20.1 |
| 5 | 30 | 31.32 | 1124.4 | 32.4 |
| 6 | 45 | 36.60 | 1155.6 | 39.0 |
| 7 | 60 | 36.10 | 1186.7 | 39.5 |
| 8 | 75 | 38.44 | 1217.8 | 43.1 |
| 9 | 90 | 40.00 | 1248.9 | 46.0 |
| 10 | 120 | 46.01 | 1280.0 | 54.3 |

*Flotation cell used.

About 54.3% of copper by weight was recovered at a leaching temperature of about 35°–40° C.

EXAMPLE 8

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 150 | 50 | 1000 | 250 | 35–40 | — | 3 |

Experimental Results

| | Volume (ml) | Cu-Conc (gpl) | Calculated Feed Grade (%) |
|---|---|---|---|
| Filtrate | 1310 | 30.40 | |
| Wash | 515 | 2.11 | 38.0 Cu |

Residue weight 206.0 gram

| Residue analysis | Cu % | Fe % | S % | Zn % | Pb % | Cd % | As % |
|---|---|---|---|---|---|---|---|
| | 26.26 | 20.42 | 35.33 | 0.18 | 0.12 | — | — |

| Sample | Time (min) | Cu-Conc (gpl) | Remain. Volume (ml) | Cu-Recovery (%) |
|---|---|---|---|---|
| 1 | 2 | 4.43 | 1000.0 | 4.7 |
| 2 | 5 | 5.91 | 1034.4 | 6.4 |
| 3 | 10 | 10.16 | 1068.9 | 11.4 |
| 4 | 15 | 13.18 | 1103.3 | 15.3 |
| 5 | 30 | 24.32 | 1137.8 | 29.1 |
| 6 | 45 | 32.50 | 1172.2 | 40.1 |
| 7 | 60 | 32.16 | 1206.7 | 40.8 |
| 8 | 75 | 30.21 | 1241.1 | 39.5 |
| 9 | 90 | 30.72 | 1275.6 | 41.2 |
| 10 | 120 | 28.95 | 1310.0 | 39.9 |

*Flotation cell used.

Following 120 minutes of leaching, approximately 40% of the copper was recovered, substantially the same amount being recovered at 60 minutes or 1 hour of leaching at 35°–40° C.

EXAMPLE 9

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 80 | 50 | 1000 | 250 | 35–40 | — | 3 |

Experimental Results

EXAMPLE 9 -continued

|  | Volume (ml) | Cu-Conc (gpl) | Feed Grade (%) |
|---|---|---|---|
| Filtrate | 1335 | 27.66 |  |
| Wash | 610 | 2.37 | 36.8 Cu |
| Residue weight | 209.3 gram | | |

| Residue analysis | Cu % | Fe % | S % | Zn % | Pb % | Cd % | As % |
|---|---|---|---|---|---|---|---|
| | 25.58 | 16.26 | 28.38 | — | — | — | — |

| Sample | Time (min) | Cu-Conc (gpl) | Remain. Volume (ml) | Cu-Recovery (%) |
|---|---|---|---|---|
| 1 | 2 | 2.27 | 1000.0 | 2.5 |
| 2 | 5 | 3.85 | 1033.5 | 4.3 |
| 3 | 10 | 6.17 | 1067.0 | 7.2 |
| 4 | 15 | 7.74 | 1100.5 | 9.3 |
| 5 | 30 | 14.73 | 1134.0 | 18.2 |
| 6 | 45 | 19.92 | 1167.5 | 25.3 |
| 7 | 60 | 24.25 | 1201.0 | 31.7 |
| 8 | 75 | 26.57 | 1234.5 | 35.7 |
| 9 | 90 | 27.19 | 1268.0 | 37.5 |
| 10 | 105 | 27.42 | 1301.5 | 38.8 |
| 11 | 120 | 26.50 | 1335.0 | 38.5 |

*Flotation cell used.

At 60 minutes of leaching, 31.7% of copper by weight was recovered, while at 120 minutes, the amount of copper recovered increased to 38.5%.

EXAMPLE 10

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 37 | 23.1 | 1000 | 100 | 25 | — | 3 (−400 mesh) |

Experimental Results

|  | Volume (ml) | Cu-Conc (gpl) | Calculated Feed Grade (%) |
|---|---|---|---|
| Filtrate | 1140 | 16.64 | |
| Wash | 450 | 0.63 | 48.2 Cu |
| Residue weight | 79.2 gram | | |

| Residue analysis | Cu % | Fe % | S % | Zn % | Pb % | Cd % | As % |
|---|---|---|---|---|---|---|---|
| | 36.58 | 14.46 | 32.22 | — | — | — | — |

| Sample | Time (min) | Cu-Conc (gpl) | Remain. Volume (ml) | Cu-Recovery (%) |
|---|---|---|---|---|
| 1 | 2 | 3.44 | 1000.0 | 7.1 |
| 2 | 5 | 4.51 | 1014.0 | 9.5 |
| 3 | 10 | 6.83 | 1028.0 | 14.6 |
| 4 | 15 | 9.01 | 1042.0 | 19.5 |
| 5 | 30 | 14.02 | 1056.0 | 30.7 |
| 6 | 45 | 16.22 | 1070.0 | 36.0 |
| 7 | 60 | 16.80 | 1084.0 | 37.8 |
| 8 | 75 | 16.74 | 1098.0 | 38.1 |
| 9 | 90 | 16.44 | 1112.0 | 37.9 |
| 10 | 105 | 16.70 | 1126.0 | 39.0 |
| 11 | 120 | 16.69 | 1140.0 | 39.5 |

*Flotation cell used.

This example is of particular interest in that the amount of ammonium sulfate and free ammonia was relatively low. Yet the recovery of copper was relatively high after 60 and 120 minutes of leaching at 25° C. This is attributed to the fine particle size −400 mesh.

The following examples 11 to 18 speak for themselves and need no further discussion.

EXAMPLE 11

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 80 | 25 | 1000 | 250 | 35-40 | — | 3 |

Experimental Results

|  | Volume (ml) | Cu-Conc (gpl) | Calculated Feed Grade (%) |
|---|---|---|---|
| Filtrate | 1160 | 31.96 | |
| Wash | 530 | 2.03 | 40.3 Cu |
| Residue weight | 211.7 gram | | |

| Residue analysis | Cu % | Fe % | S % | Zn % | Pb % | Cd % | As % |
|---|---|---|---|---|---|---|---|
| | 29.60 | 19.29 | 33.68 | — | — | — | — |

| Sample | Time (min) | Cu-Conc (gpl) | Remain. Volume (ml) | Cu-Recovery (%) |
|---|---|---|---|---|
| 1 | 2 | 3.36 | 1000.0 | 3.3 |
| 2 | 5 | 5.18 | 1016.0 | 5.2 |
| 3 | 10 | 7.94 | 1032.0 | 8.1 |
| 4 | 15 | 9.72 | 1048.0 | 10.1 |
| 5 | 30 | 19.35 | 1064.0 | 16.7 |
| 6 | 45 | 20.38 | 1080.0 | 21.8 |
| 7 | 60 | 25.78 | 1096.0 | 28.0 |
| 8 | 75 | 28.74 | 1112.0 | 31.7 |
| 9 | 90 | 30.58 | 1128.0 | 34.2 |
| 10 | 105 | 30.60 | 1144.0 | 34.7 |
| 11 | 120 | 31.86 | 1160.0 | 36.7 |

*Flotation cell used.

EXAMPLE 12

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 40 | 50 | 1000 | 250 | 35-40 | — | 3 |

Experimental Results

|  | Volume (ml) | Cu-Conc (gpl) | Calculated Feed Grade (%) |
|---|---|---|---|
| Filtrate | 1110 | 28.72 | |
| Wash | 700 | 2.16 | 40.4 Cu |
| Residue weight | 220.1 gram | | |

| Residue analysis | Cu % | Fe % | S % | Zn % | Pb % | Cd % | As % |
|---|---|---|---|---|---|---|---|
| | 30.76 | 18.61 | 32.66 | — | — | — | — |

| Sample | Time (min) | Cu-Conc (gpl) | Remain. Volume (ml) | Cu-Recovery (%) |
|---|---|---|---|---|
| 1 | 2 | 3.81 | 1000.0 | 3.8 |
| 2 | 5 | 6.31 | 1011.0 | 6.3 |
| 3 | 10 | 9.25 | 1022.0 | 9.4 |
| 4 | 15 | 11.95 | 1033.0 | 12.2 |
| 5 | 30 | 19.35 | 1044.0 | 20.0 |
| 6 | 45 | 25.73 | 1055.0 | 26.9 |
| 7 | 60 | 26.88 | 1066.0 | 28.3 |
| 8 | 75 | 26.99 | 1077.0 | 28.8 |
| 9 | 90 | 25.71 | 1088.0 | 27.7 |
| 10 | 105 | 26.43 | 1099.0 | 28.7 |
| 11 | 120 | 26.64 | 1110.0 | 29.3 |

*Flotation cell used.

EXAMPLE 13

Experiment Conditions

| Ammonium Sulfate | Free Ammonia | Volume | Solids | Temp | Air* | Concentrate |

EXAMPLE 13 -continued

| (gpl) | (gpl) | (ml) | (gpl) | (°C.) | (l pm) | (#) |
|---|---|---|---|---|---|---|
| 30 | 18.6 | 1000 | 100 | 25 | — | 3 (−200/+400 mesh) |

Experimental Results

| | Volume (ml) | Cu-Conc (gpl) | Calculated Feed Grade (%) |
|---|---|---|---|
| Filtrate | 1085 | 14.48 | |
| Wash | 720 | 0.04 | 39.2 Cu |
| Residue weight | 82.1 gram | | |
| Residue analysis | Cu % | Fe % | S % | Zn % | Pb % | Cd % | As % |
| | 28.62 | 22.94 | 38.62 | — | — | — | — |

| Sample | Time (min) | Cu-Conc (gpl) | Remain. Volume (ml) | Cu-Recovery (%) |
|---|---|---|---|---|
| 1 | 2 | 1.61 | 1000.0 | 4.1 |
| 2 | 5 | 2.72 | 1009.4 | 7.0 |
| 3 | 10 | 4.04 | 1018.9 | 10.5 |
| 4 | 15 | 5.06 | 1028.3 | 13.3 |
| 5 | 30 | 8.76 | 1037.8 | 23.2 |
| 6 | 45 | 11.65 | 1047.2 | 31.1 |
| 7 | 75 | 13.76 | 1056.7 | 37.1 |
| 8 | 90 | 13.76 | 1066.1 | 37.4 |
| 9 | 105 | 14.25 | 1075.6 | 39.1 |
| 10 | 120 | 14.24 | 1085.0 | 39.4 |

*Flotation cell used.

EXAMPLE 14

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 21 | 13.1 | 1000 | 100 | 25 | — | 3 (−100/+200 mesh) |

Experimental Results

| | Volume (ml) | Cu-Conc (gpl) | Calculated Feed Grade (%) |
|---|---|---|---|
| Filtrate | 1095 | 10.39 | |
| Wash | 760 | 0.01 | 29.9 Cu |
| Residue weight | 88.8 gram | | |
| Residue analysis | Cu % | Fe % | S % | Zn % | Pb % | Cd % | As % |
| | 20.90 | 25.90 | 38.56 | — | — | — | — |

| Sample | Time (min) | Cu-Conc (gpl) | Remain. Volume (ml) | Cu-Recovery (%) |
|---|---|---|---|---|
| 1 | 2 | 0.99 | 1000.0 | 3.3 |
| 2 | 5 | 1.71 | 1009.5 | 5.8 |
| 3 | 10 | 2.45 | 1019.0 | 8.3 |
| 4 | 15 | 3.13 | 1028.5 | 10.8 |
| 5 | 30 | 5.11 | 1038.0 | 17.7 |
| 6 | 45 | 7.09 | 1047.5 | 24.8 |
| 7 | 60 | 8.35 | 1057.0 | 29.5 |
| 8 | 75 | 9.27 | 1066.5 | 33.0 |
| 9 | 90 | 9.60 | 1076.0 | 34.5 |
| 10 | 105 | 9.88 | 1085.5 | 35.8 |
| 11 | 120 | 10.39 | 1095.0 | 38.0 |

*Flotation cell used.

EXAMPLE 15

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 80 | 60 | 1000 | 250 | 25 | — | 3 |

Experimental Results

| | Volume (ml) | Cu-Conc (gpl) | Calculated Feed Grade (%) |
|---|---|---|---|
| Filtrate | 1320 | 28.93 | |
| Wash | 670 | 2.18 | 37.3 Cu |
| Residue weight | 209.9 gram | | |
| Residue analysis | Cu % | Fe % | S % | Zn % | Pb % | Cd % | As % |
| | 25.54 | 16.41 | 28.88 | — | — | — | — |

| Sample | Time (min) | Cu-Conc (gpl) | Remain. Volume (ml) | Cu-Recovery (%) |
|---|---|---|---|---|
| 1 | 2 | 3.47 | 1000.0 | 3.7 |
| 2 | 5 | 5.22 | 1032.0 | 5.8 |
| 3 | 10 | 7.59 | 1064.0 | 8.7 |
| 4 | 15 | 9.89 | 1096.0 | 11.6 |
| 5 | 30 | 16.65 | 1128.0 | 20.1 |
| 6 | 45 | 21.75 | 1160.0 | 27.1 |
| 7 | 60 | 26.43 | 1192.0 | 33.8 |
| 8 | 75 | 27.45 | 1224.0 | 36.0 |
| 9 | 90 | 27.77 | 1256.0 | 37.4 |
| 10 | 105 | 28.14 | 1228.0 | 38.9 |
| 11 | 120 | 28.44 | 1320.0 | 40.3 |

*Flotation cell used.

EXAMPLE 16

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 32 | 20 | 1000 | 100 | 22 | — | 3 |

Experimental Results

| | Volume (ml) | Cu-Conc (gpl) | Calculated Feed Grade (%) |
|---|---|---|---|
| Filtrate | 1180 | 14.14 | |
| Wash | 730 | 0.02 | 39.3 Cu |
| Residue weight | 81.8 gram | | |
| Residue analysis | Cu % | Fe % | S % | Zn % | Pb % | Cd % | As % |
| | 27.64 | 18.51 | 33.24 | — | — | — | — |

| Sample | Time (min) | Cu-Conc (gpl) | Remain. Volume (ml) | Cu-Recovery (%) |
|---|---|---|---|---|
| 1 | 2 | 2.04 | 1000.0 | 5.2 |
| 2 | 5 | 3.46 | 1018.0 | 9.0 |
| 3 | 10 | 5.85 | 1036.0 | 15.4 |
| 4 | 15 | 7.08 | 1054.0 | 19.0 |
| 5 | 30 | 11.06 | 1072.0 | 30.2 |
| 6 | 45 | 13.57 | 1090.0 | 37.6 |
| 7 | 60 | 13.54 | 1108.0 | 38.2 |
| 8 | 75 | 13.36 | 1126.0 | 38.3 |
| 9 | 90 | 13.74 | 1144.0 | 40.0 |
| 10 | 105 | 13.90 | 1162.0 | 41.1 |
| 11 | 120 | 13.79 | 1180.0 | 41.4 |

*Flotation cell used.

EXAMPLE 17

Experiment Conditions

| Ammonium Sulfate (gpl) | Free Ammonia (gpl) | Volume (ml) | Solids (gpl) | Temp (°C.) | Air* (l pm) | Concentrate (#) |
|---|---|---|---|---|---|---|
| 32 | 20 | 1000 | 100 | 42 | — | 3 |

EXAMPLE 17 (continued)

Experimental Results

|  | Volume (ml) | Cu-Conc (gpl) | Calculated Feed Grade (%) |
|---|---|---|---|
| Filtrate | 1100 | 16.17 | |
| Wash | 465 | 0.17 | 38.3 Cu |
| Residue weight | 79.6 gram | | |

| Residue analysis | Cu % | Fe % | S % | Zn % | Pb % | Cd % | As % |
|---|---|---|---|---|---|---|---|
| | 25.6 | 20.5 | 34.4 | — | — | — | — |

| Sample | Time (min) | Cu-Conc (gpl) | Remain. Volume (ml) | Cu-Recovery (%) |
|---|---|---|---|---|
| 1 | 2 | 2.48 | 1000.0 | 6.5 |
| 2 | 5 | 4.19 | 1010.0 | 11.1 |
| 3 | 10 | 6.62 | 1020.0 | 17.6 |
| 4 | 15 | 8.57 | 1030.0 | 23.1 |
| 5 | 30 | 12.77 | 1040.0 | 34.7 |
| 6 | 45 | 14.61 | 1050.0 | 40.1 |
| 7 | 60 | 14.96 | 1060.0 | 41.4 |
| 8 | 75 | 15.43 | 1070.0 | 43.2 |
| 9 | 90 | 15.16 | 1080.0 | 42.8 |
| 10 | 105 | 15.11 | 1090.0 | 43.0 |
| 11 | 120 | 15.71 | 1100.0 | 45.2 |

*Flotation cell used.

EXAMPLE 18

Experiment Conditions

| Ammonium Sulfate (gpl) | Free Ammonia (gpl) | Volume (ml) | Solids (gpl) | Temp (°C.) | Air* (1 pm) | Concentrate (#) |
|---|---|---|---|---|---|---|
| 32 | 20 | 1000 | 100 | 66 | — | 3 |

Experimental Results

|  | Volume (ml) | Cu-Conc (gpl) | Calculated Feed Grade (%) |
|---|---|---|---|
| Filtrate | 1075 | 11.53 | |
| Wash | 800 | 0.38 | 38.6 Cu |
| Residue weight | 89.3 gram | | |

| Residue analysis | Cu % | Fe % | S % | Zn % | Pb % | Cd % | As % |
|---|---|---|---|---|---|---|---|
| | 29.04 | 18.01 | 29.22 | — | — | — | — |

| Sample | Time (min) | Cu-Conc (gpl) | Remain. Volume (ml) | Cu-Recovery (%) |
|---|---|---|---|---|
| 1 | 2 | 2.41 | 1000.0 | 6.2 |
| 2 | 5 | 3.88 | 1007.5 | 10.1 |
| 3 | 10 | 6.78 | 1015.0 | 17.8 |
| 4 | 15 | 8.36 | 1022.5 | 22.1 |
| 5 | 30 | 12.94 | 1030.0 | 34.5 |
| 6 | 45 | 15.11 | 1037.5 | 40.6 |
| 7 | 60 | 16.19 | 1045.0 | 43.8 |
| 8 | 75 | 17.17 | 1052.5 | 46.8 |
| 9 | 90 | 17.52 | 1060.0 | 48.1 |
| 10 | 105 | 13.91 | 1067.5 | 38.4 |
| 11 | 120 | 11.62 | 1075.0 | 32.3 |

*Flotation cell used.

Example 19 which follows illustrates the use of the raffinate from the solvent extraction operation as recycle leaching solution. As will be noted, the copper recovery is in the neighborhood of 17.5 to 18.5% by weight at 60 and 120 minutes of leaching.

EXAMPLE 19

Experiment Conditions

| Ammonium Sulfate (gpl) | Free Ammonia (gpl) | Volume (ml) | Solids (gpl) | Temp (°C.) | Air* (1 pm) | Concentrate (#) |
|---|---|---|---|---|---|---|
| ±80 | ±20 | 1000 | 75 | 35-40 | — | 1 |

Experimental Results

|  | Volume (ml) | Cu-Conc (gpl) | Calculated Feed Grade (%) |
|---|---|---|---|
| Filtrate | 1080 | 4.35 | |
| Wash | 305 | 0.19 | 34.6 Cu |
| Residue weight | 64.7 gram | | |

| Residue analysis | Cu % | Fe % | S % | Zn % | Pb % | Cd % | As % |
|---|---|---|---|---|---|---|---|
| | 32.77 | 16.65 | 29.94 | — | — | — | — |

| Sample | Time (min) | Cu-Conc (gpl) | Remain. Volume (ml) | Cu-Recovery (%) |
|---|---|---|---|---|
| 1 | 2 | 4.09 | 1000.0 | 15.8 |
| 2 | 5 | 4.18 | 1008.0 | 16.2 |
| 3 | 10 | 4.24 | 1016.0 | 16.6 |
| 4 | 15 | 4.37 | 1024.0 | 17.2 |
| 5 | 30 | 4.48 | 1032.0 | 17.8 |
| 6 | 45 | 4.54 | 1040.0 | 18.2 |
| 7 | 60 | 4.57 | 1048.0 | 18.5 |
| 8 | 75 | 4.48 | 1056.0 | 18.2 |
| 9 | 90 | 4.43 | 1064.0 | 18.2 |
| 10 | 105 | 4.27 | 1072.0 | 17.6 |
| 11 | 120 | 4.30 | 1080.0 | 17.9 |

*Flotation cell used.

Substantially all of the tests were conducted on Concentrate #3, except for Example 1 in which Concentrate #2 was tested.

Referring to Example 19, Concentrate #1 was tested using recycle leach solutions. The pregnant filtrate contained upwards of about 4.5 gpl copper.

THE EFFECT OF PARTICLE SIZE

The Effect of initial particle size was observed in which three different particle size fractions were leached: −100+200 mesh (Example 14), −200+400 mesh (Example 13), and −400 mesh (Example 10). Confirming previously found results, see Table 3, the copper is not equally distributed over the different particle sizes. This is shown in Table 4.

TABLE 4

Copper content of three particle sizes.

| Particle Size (mesh) | Copper (%) |
|---|---|
| −100 +200 | 27.3 |
| −200 +400 | 37.2 |
| −400 | 46.1 |

As will be apparent from Examples 10, 13 and 14, the finer the particle size, the higher the copper recovery for the same period of leaching, for example, 60 minutes or one hour.

The results also show that increasing the temperature increases the rate of copper dissolution. However, the advantage of the invention is that the desirable leaching results are obtained at ambient temperature, e.g. at 25° C.

For example, it will be noted that substantially high copper recoveries were obtained in 60 minutes at 25° C. in Examples 1 and 3, the preferred temperature being aout 35°-40° C. The advantages of working at the low temperature is that the loss of free ammonia due to vaporization is minimized. While the temperature can range from about 10° to 95° C., it is preferred that the temperatures range from about 20° C. to 40° C.

It is preferred in carrying out the ammoniacal leach of the invention that a flotation-type cell be used. The advantage of using such a cell is that a better distribution of air is obtained throughout the leach solution which results in a higher yield of copper recovery over a shorter time period as compared to using air agitation or agitation without air.

This is clearly illustrated by the curves of FIG. 1 in which the use of the flotation-type cell is shown to be superior to agitation with air and substantially superior to agitation without air.

Figure 2:
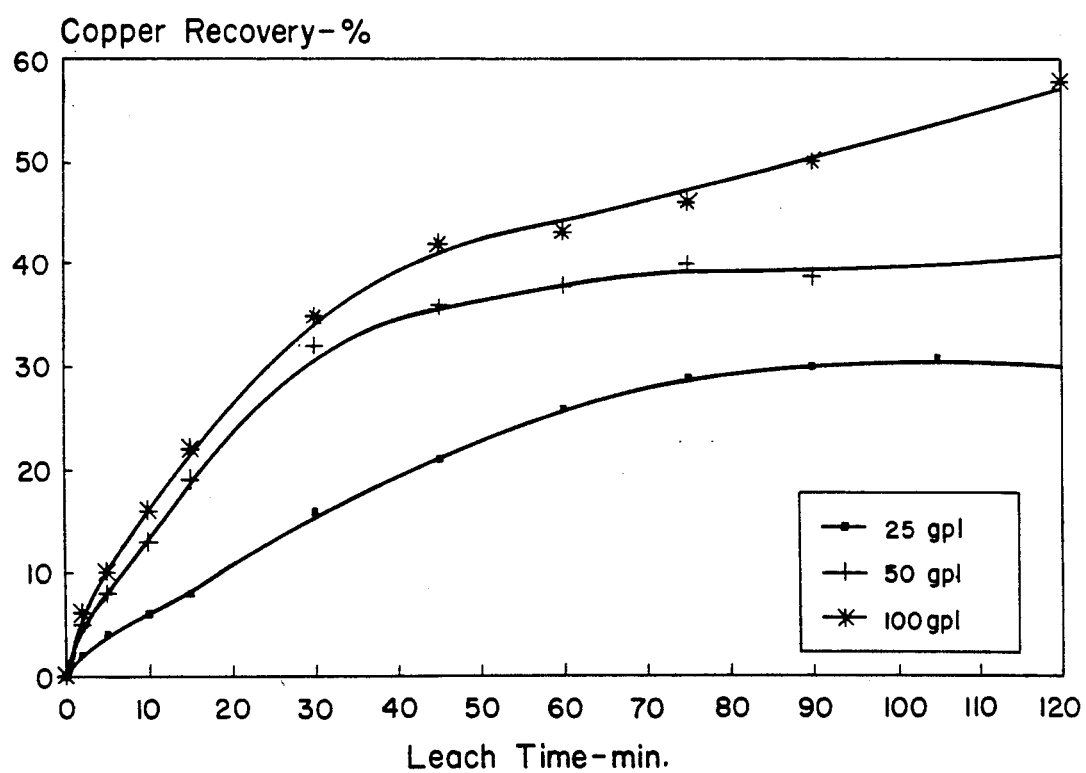
FIG. 2 shows curves illustrating the effect of ammonia concentration on the recovery of copper.

The influence of ammonia concentration on copper recovery is depicted by the curves of FIG. 2. The higher the ammonia concentration, the greater is the recovery. The difference between 50 gpl and 100 gpl ammonia is not that great to warrant the use of the higher ammonia concentration. Substantial recovery of copper is indicated with 50 gpl ammonia, optimum recovery being achieved in the neighborhood of about 60 minutes, the recovery thereafter approaching the asymptotic limit of about 40% copper recovery. Thus, the cuprous copper present is leached substantially rapidly while avoiding the oxidation of cupric sulfide to the sulfate state which otherwise would consume the free ammonia in the system by conversion to ammonium sulfate. This is shown by the curve in FIG. 2 at 100 gpl ammonia as copper recovery extends beyond 40% after 60 minutes of leaching.

Figure 3:
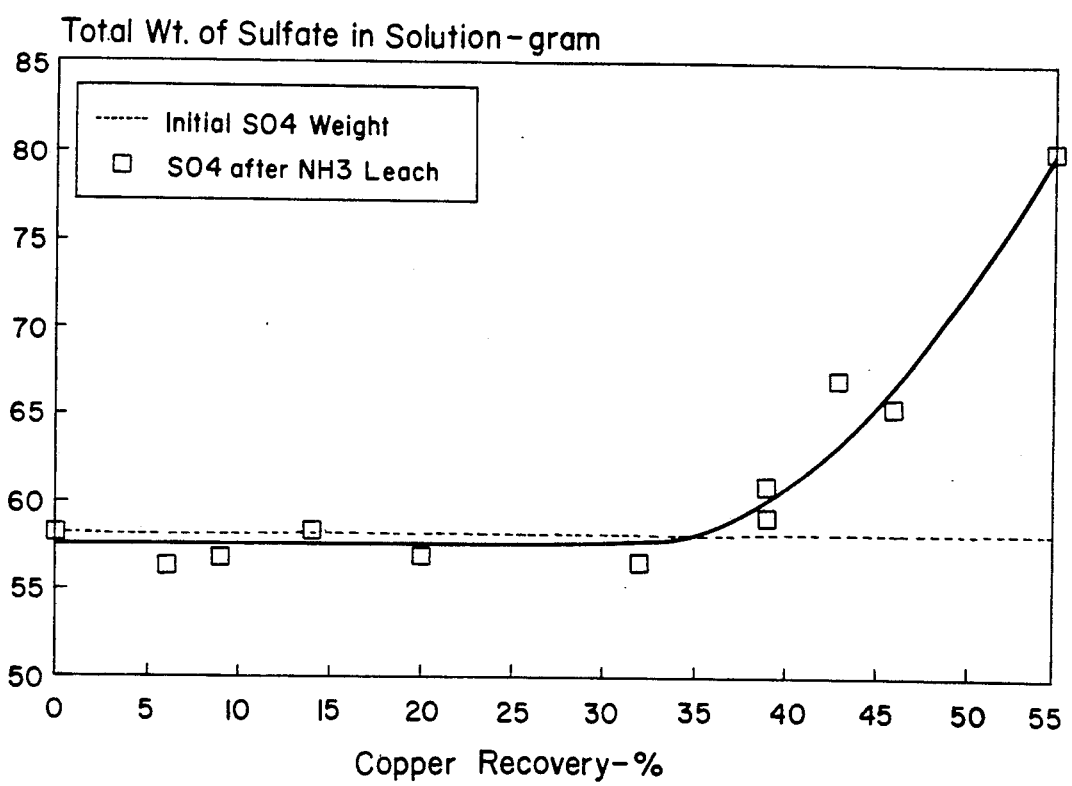
FIG. 3 is a curve illustrating the formation of additional sulfate when the amount of copper leached exceeds a certain desired maximum due to the oxidation of sulfide sulfur to sulfate which is to be minimized or avoided.

FIG. 3 depicts the recovery of copper at a constant total sulfate content of about 55 grams, the maximum copper dissolved being about 35% by weight following which continual leaching results in oxidation of cupric sulfide to sulfate at above 35% copper recovery, the amount of sulfate increasing upwards to about 80 grams or about a 60% increase. The present invention avoids or substantially limits the oxidation of cupric sulfide to sulfate to less than about 10%, preferably not exceeding about 5% by weight, which minimizes substantially the conversion of free ammonia to ammonium sulfate.

Figure 4:
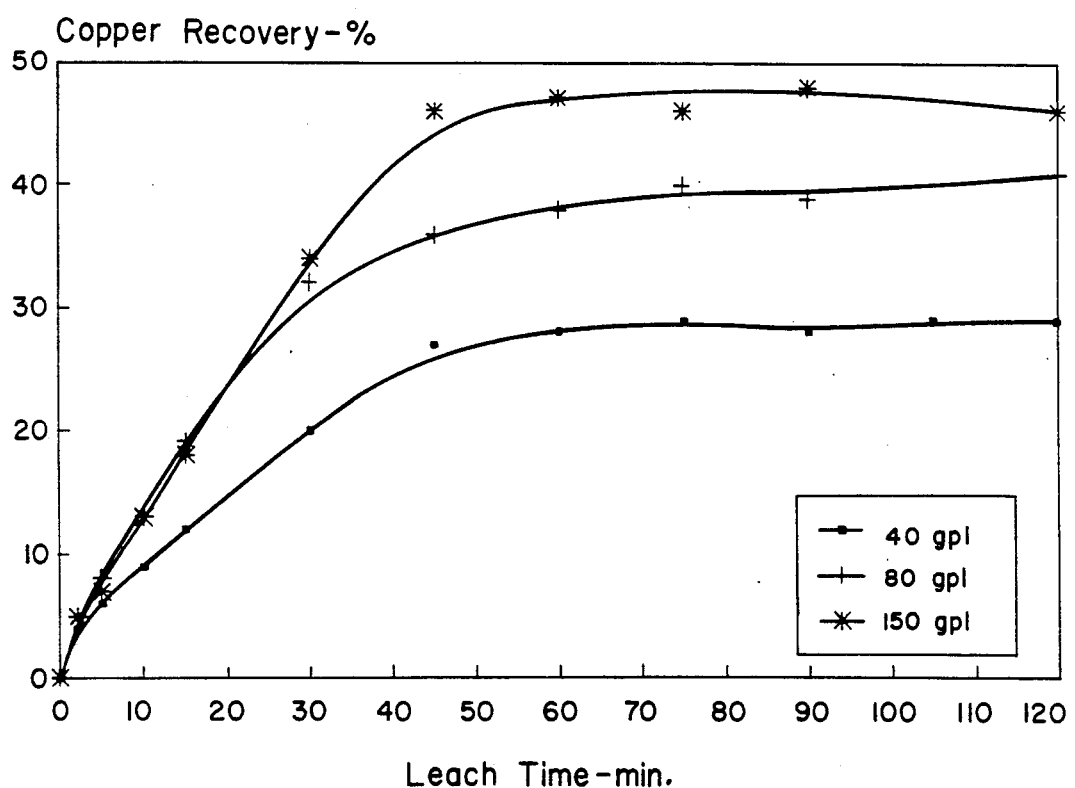
FIG. 4 depicts a set of curves showing the effect of ammonium sulfate concentration on copper recovery over a prescribed time period.

The influence of ammonium sulfate concentration on copper recovery is illustrated in the curves of FIG. 4, the maximum recovery being obtained at 150 gpl ammonium sulfate. However, substantial copper recoveries are obtained at 80 gpl ammonium sulfate as illustrated by the examples hereinabove.

Figure 5:
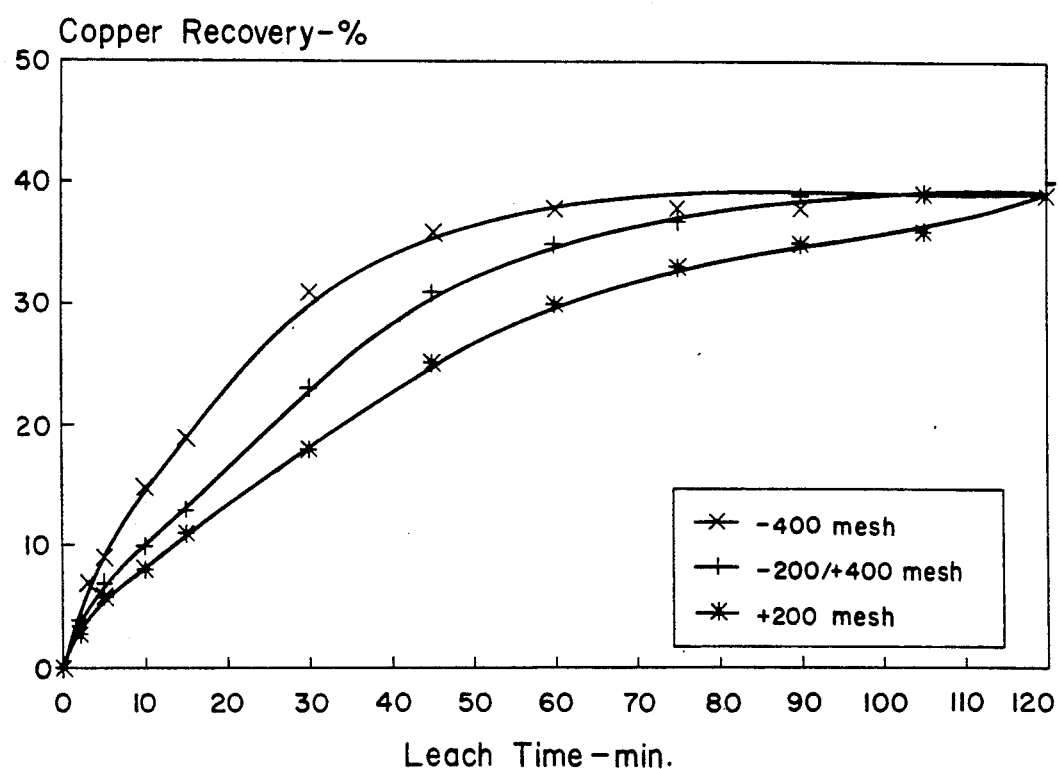
FIG. 5 shows curves depicting the effect of particle size on copper recovery as a function of the time of leaching.

FIG. 5 depicts the effect of particle size on copper recovery. The recoveries obtained with various size fractions merge at leaching times between about 60 and 120 minutes (1 to 2 hrs.) It will be noted that the −400 mesh concentrate achieves substantially maximum recovery of copper between 40 and 60 minutes.

Figure 6:
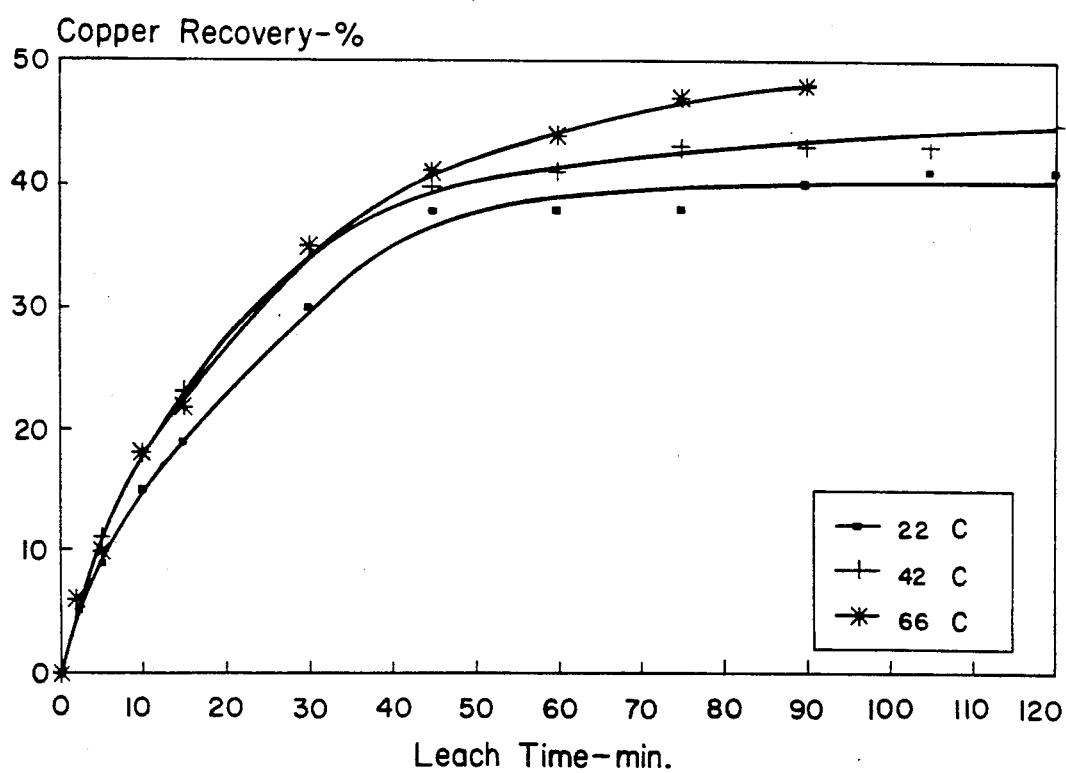
FIG. 6 shows leaching curves which illustrate the effect of temperature on copper recovery as a function of the time of leaching.

The influence of temperature on copper recovery is shown in the curves of FIG. 6 which illustrate the effect of 22° C., 42° C. and 66° C., respectfully. Between leaching times of 60 and 120 minutes, the differences are not that substantial. This is due to the fact that cuprous sulfide is more selectively leachable at ambient temperatures and pressures than cupric sulfide. The use of ambient temperature has the advantage of conserving ammonia which has a relatively high vapor pressure at above ambient temperature. Minimizing the oxidation of sulfide sulfur to sulfate also conserves the ammonia in the system.

SOLVENT EXTRACTION

Copper solvent extraction from ammoniacal solutions is known for recovering copper in order to regenerate the ammoniacal solution for recycling into the leaching circuit.

The most commonly used copper solvent extraction reagents are hydroximes. These chelating agents are commercially available as LIX 84 and also as LIX 54, both sold by the Henkel Corporation of Tucson, Ariz.

LIX 84 solvent extraction reagent is a water insoluble 2-hydroxy-5-nonylacetophenone oxime in a mixture with 5-dodecylsalicyladoxime and a high flash point kerosene. It forms water insoluble complexes with various metallic cations in a manner similar to that for copper.

The LIX 54 solvent extraction agent is a water-insoluble phenyl alkyl beta-diketone which similarly forms water-insoluble complexes with various metallic cations.

LIX 54 is a relatively weak copper extractant which can load up to 40 gpl as purchased and which can be used with no further dilution. Because it is a weak extractant, LIX 54 can be stripped easily with an aqueous solution whose equilibrium acid concentration is low but whose equilibrium copper concentration is high.

With regard to copper extraction from ammoniacal solutions, the general equation is given as follows:

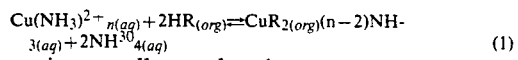

where n is generally equal to 4.

In copper solvent extraction processes, the copper extracted from the aqueous feed solution into the solvent is replaced by hydrogen ions given up by the solvent as reaction (1) goes from left to right. The aqueous solution, therefore, becomes more acidic as it loses copper. However, at the same time as the organic produces an acid ion (proton), the cupric tetra-amino complex is broken down releasing four $NH_3$ molecules which act to buffer the hydrogen ions and to raise the pH as well. This important feature is illustrated in reaction (1) is the regeneration of ammonia. Therefore, since the raffinate with the regenerated ammonia is returned to leaching, only makeup ammonia is needed, where necessary, as the active leach ingredient is being recycled. Insofar a the invention is concerned, make-up ammonia is substantially minimized.

To reclaim ( or strip) the copper from the organic solvent, reaction (1) is not reversed, but the copper is recovered from the organic phase by contacting the solvent with a sulfuric acid solution in the form of spent electrolyte from the electrowinning circuit as follows:

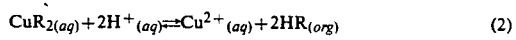

Besides the regeneration of the ammoniacal lixiviant, the use of solvent extraction from ammoniacal solutions has other advantages. It is less cost intensive in that the organic loading can be much higher in an alkaline circuit than in an acid one. Copper transfer as high as 35–40 gpl Cu can be obtained in an ammonia environment as compared to only 5 to 10 gpl for an acid circuit. Because more copper can be loaded from the leach solution, the leaching can also be carried in a more concentrated form.

In carrying out the solvent extraction step, the aqueous solution is mixed with the immiscible organic reagent, at which time copper is pulled from the aqueous alkaline solution to the organic phase. The kinetics of the reaction is very rapid and in just a few minutes substantially all of the copper is loaded in the organic phase.

The copper-loaded organic is then transferred from the extraction to the stripping section where the extracted copper is stripped from the organic phase using an aqueous sulfuric acid solution. The solution may be the recycled electrolyte from the electrowinning circuit impoverished in copper following the recovery of pure copper produced at the cathode.

Figure 7:
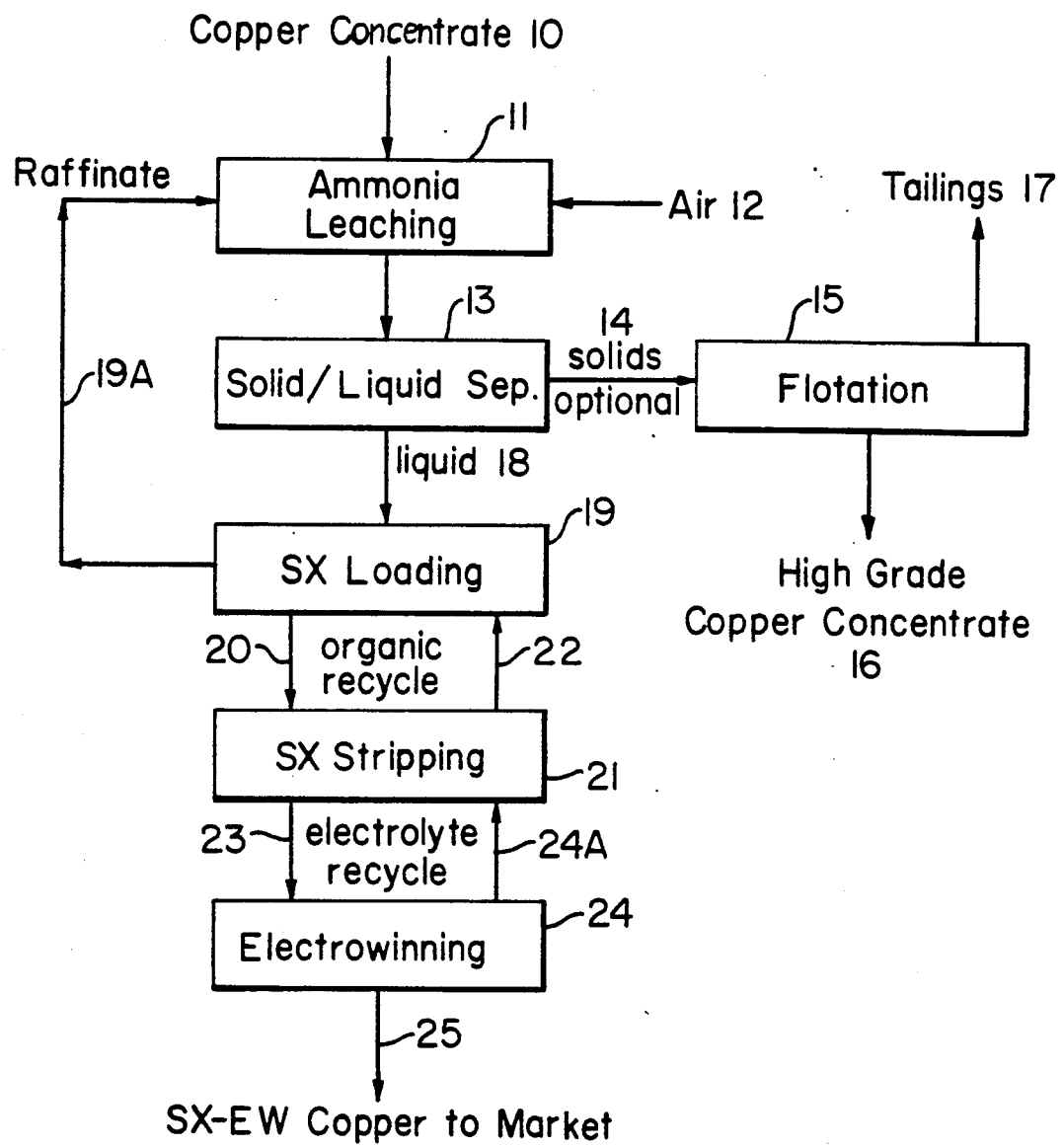
FIG. 7 depicts the leaching and the solvent extraction-electrowinning flow scheme.

A flow sheet of one embodiment of a countercurrent solvent extraction circuit is shown schematically in FIG. 7.

Copper concentrate 10 is subjected to ammonia leaching 11 using air 12 as the oxidant. Following leaching, the mixture is passed to solids/liquid separation 13 from which the solids or residue 14 is optionally subjected to flotation at 15 where it is converted to a high grade concentrate 16 and tailing 17.

In the alternative, where the residue is fairly high in copper, the residue may be used as part of a charge to a smelter.

The pregnant liquor or liquid 18 following solid/liquid separation is subjected to solvent extraction (SX) at 19 to provide a copper loaded organic 20 which is subjected to solvent extraction (SX) stripping with sulfuric acid at 21 and the stripped organic 22 recycled to SX loading at 19. The raffinate 19A from SX loading 19 is recycled to ammonia leaching at 11. The stripped copper as a copper sulfate/sulfuric acid electrolyle 23 is passed on to the electrowinning cells at 24 where electrolytic copper 25 (SX-EW) is produced for market.

The copper-impoverished electrolyte 24A is recycled to SX stripping to strip copper from copper loaded SX being fed to SX stripping 21.

Thus, a closed circuit is provided wherein pregnant copper sulfate solution liquid 18 is subjected to solvent extraction at 19 using the organic solvent and the loaded organic 20 stripped of its copper at SX stripping 21 preferably using electrolyte recycle solution 22 and the copper electrolyte produced subjected to electrowinning at electrowinning cells 24.

In summary, the invention provides a hydrometallurgical method for leaching copper sulfide flotation concentrates containing significant amounts of cuprous sulfide.

In carrying out the method, finely divided copper sulfide concentrate containing at least about 15% of the total copper as cuprous copper in the form of a slurry is subjected to leaching in the ammonia/ammonium sulfate solution under substantially ambient pressure and temperature while continuously aerating the slurry for a time at least sufficient to dissolve the cuprous copper and oxidize it to the cupric state. The leaching is carried out for a relatively short period of time ranging up to about 2 hours preferably not exceeding 1 or 1½ hours.

The pregnant filtrate following completion of leaching contains at least about 15% of the total copper by weight, generally at least about 20% or 25% by weight copper, the residue remaining providing a valuable intermediate containing at least about 20% copper, and generally, at least about 25% copper by weight which can be added directly to a smelter or further enriched in copper by flotation.

In preparing the pregnant filtrate for electrowinning, it is subjected to solvent extraction using an organic solution specific to the extraction of copper.

Preliminary test work with LIX 84 and a feed solution obtained from leaching a large batch of six-year-old Escondida concentrate (i.e. Concentrate 1) indicated that LIX 84 was a powerful copper extractant with a loading of 0.485 grams of copper per one vol % reagent, thus providing a maximum loading capacity of about 50 gpl copper. The organic phase used in the bench-scale operation was a mixture of 35% LIX 84 and 65% kerosene by volume.

Tests with LIX 54 comprising 75% LIX 54 and 25% kerosene by volume provided a maximum copper loading of about 40 gpl copper.

With respect to LIX 84, the range of composition with kerosene may range by volume from about 20% to 85% LIX 84 and 80% to 15% kerosene.

In the case of LIX 54, the range of composition with kerosene may range from about 20% to 100% LIX 54 and about 80% to 0% kerosene, that is to say, LIX 54 may be used without kerosene.

In stripping the copper from the organic solvent, an aqueous sulfuric acid solution may be used ranging in composition from about 50 to 200 gpl. Where the stripping solution is a spent copper electrolyte, the solution may contain up to about 15 gpl copper and about 20 gpl to 200 gpl sulfuric acid.

Generally speaking, the pregnant copper leach solution contains about 10 gpl to 60 gpl copper.

In the solvent extraction process, the ratio of the organic solution to the pregnant solution may range by volume from about 1:5 to 1:0.25.

In the copper stripping process, the ratio of the organic to the stripping solution may range from about 1:4 to 1:0.5, the copper-loaded stripping solution being thereafter subjected to electrowinning. In producing electrolytic copper, the current density employed may range from about 15 to 35 amperes per sq.ft.

As stated herein, the residue remaining following leaching provides a valuable intermediate containing at least about 20% copper. The residue can be further treated in a smelter to recover the copper therefrom or up-graded by subjecting the residue to conventional flotation and provide a secondary flotation concentrate containing at least about 30% by weight of copper.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A hydrometallurgical method comprising a leaching operation for recovering copper from particulate copper sulfide flotation concentrate containing at least about 20% copper by weight comprised of cuprous and cupric sulfide, with sulfur present as sulfide sulfur, a significant portion of the copper in said copper sulfide concentrate being in the cuprous state or monovalent state, and thereby provide after leaching a copper sulfide-containing residue as a valuable intermediate which comprises:

providing said copper sulfide flotation concentrate in the particulate state, subjecting said concentrate to leaching as a slurry with an alkaline solution of ammonia plus ammonium sulfate of concentration ranging from about 30 gpl to 150 gpl of ammonia and about 25 gpl to 200 gpl of ammonium sulfate at a temperature ranging from about 10° C. to 95° C., the amount of sulfide concentrate in said slurry ranging from about 25 gpl to 500 gpl proportioned at least stoichiometrically to the ammonia concentration of the leaching solution, and leaching said sulfide concentrate under substantially ambient pressure while continuously aerating said solution for a time at least sufficient to dissolve said cuprous copper and oxidize said cuprous copper to the cupric state while substantially minimizing the oxidation of the contained sulfide sulfate sulfur to sulfate and thereby obtain a pregnant filtrate containing at least about 15% of the total amount of copper in said concentrate and provide a washed residue as a valuable intermediate containing at least about 20% copper by weight comprised substantially of cupric sulfide for use in the further recovery of copper therefrom, the copper in the leaching solution following further processing being subsequently recovered by electrowinning.

2. The method of claim 1, wherein the leaching of said cuprous copper is carried out for a time ranging up to about 2 hours at a pH ranging from 9 to 11.

3. The method of claim 1, wherein said filtrate is subjected to an organic solvent extraction process specific to the extraction of copper, and wherein said copper-containing organic solvent is subjected to stripping with a sulfuric acid solution at a volume ratio sufficient to provide a sulfuric acid solution containing at least about 25 gpl copper, the copper thereafter being recovered by electrowinning.

4. The method of claim 3, wherein the copper is stripped from the organic solvent using a spent copper electrolyte.

5. The method of claim 1, wherein following the leaching of copper sulfide flotation concentrate, the washed residue containing at least about 20% by weight of copper is subjected to flotation to provide a second flotation concentrate containing at least about 30% by weight of copper.

6. The hydrometallurgical method as in claim 1, wherein the pregnant filtrate is contacted with an organic solvent dissolved in water-immiscible liquid organic medium to extract the copper therefrom and provide a copper-loaded organic solvent and an aqueous ammonia/ammonium sulfate raffinate solution substantially impoverished in said copper for recycling in the leaching operation, and wherein said copper-loaded organic solvent is treated with an aqueous sulfuric acid solution to recover the copper as an acid copper sulfate solution of concentration sufficient for the recovery thereof by electrowinning and to regenerate the organic solvent for reuse in the solvent extraction operation.

7. A hydrometallurgical method of recovering copper from particulate copper sulfide flotation concentrate containing at least about 20% copper by weight comprised of cuprous and cupric sulfide, with sulfur present as sulfide sulfur, a significant portion of the copper in the copper sulfide concentrate being in the cuprous state, providing said copper sulfide flotation concentrate in the particulate state, subjecting said concentrate to leaching with an alkaline solution of ammonia plus ammonium sulfate of concentration ranging from about 30 gpl to 200 gpl of ammonia and about 25 gpl to 200 gpl of ammonium sulfate at a temperature ranging from about 10° to 95° C., the amount of sulfide concentrate in said solution ranging from about 25 gpl to 500 gpl proportioned at least stoichiometrically to the ammonia concentration of the leaching solution, leaching said sulfide concentrate under substantially ambient pressure while continuously aerating said solution for a time at least sufficient to dissolve said cuprous copper and oxidize said cuprous copper to the cupric state while substantially minimizing the oxidation of sulfide sulfur to sulfate and thereby obtaining a pregnant filtrate containing at least about 15% of the total amount of copper in said concentrate and provide a washed residue containing at least about 20% of copper by weight comprised substantially of cupric sulfide, and then subjecting said residue to flotation to provide a second flotation concentration containing at least about 30% copper by weight, the copper in the leaching solution following further processing being subsequently recovered by electrowinning.

8. The method of claim 7, wherein the leaching of said cuprous copper is carried out for a time ranging up to about 2 hours.

9. The method of claim 8, wherein the leaching is carried out for a time ranging up to about 1 hour.

10. The method of claim 7, wherein the leaching temperature ranges from about 20° C. to 40° C.

11. The method of claim 7, wherein said filtrate is subjected to solvent extraction with an organic solution specific to the extraction of copper, and wherein said copper-containing solvent is subjected to stripping with a sulfuric acid-containing solution at a volume ratio sufficient to provide a sulfuric acid-containing solution containing at least about 25 gpl copper, the copper thereafter being recovered by electrowinning.

12. The method of claim 11, wherein the copper is stripped from the organic solvent using a spent copper electrolyte.

13. The hydrometallurgical method as in claim 7, wherein the pregnant filtrate is contacted with an organic solvent dissolved in water-immiscible liquid organic solvent to extract the copper therefrom and provide a copper-loaded organic solvent and an aqueous ammonia/ammonium sulfate raffinate solution substantially impoverished in said copper for recycling in the leaching operation, and wherein said copper-loaded organic solvent is treated with an aqueous sulfuric acid solution to recover the copper as an acid copper sulfate solution of concentration sufficient for the recovery thereof by electrowinning and to regenerate the organic solvent for reuse in the solvent extraction operation.

14. A hydrometallurgical method comprising a leaching operation for recovering copper from particulate copper sulfide flotation concentrate containing at least about 20% copper by weight comprised of cuprous and cupric sulfide, with sulfur present as sulfide sulfur, a significant portion of the copper in the copper sulfide concentrate being in the cuprous state or monovalent state, and thereby provide a copper sulfide-containing residue as a valuable intermediate which comprises:

providing said copper sulfide flotation concentrate in the particulate state, subjecting said concentrate to leaching as a slurry with an alkaline solution of ammonia plus ammonium sulfate of concentration ranging from about 30 gpl to 150 gpl of ammonia and about 25 gpl to 200 gpl of ammonium sulfate at a temperature ranging from about 10° C. to 95° C., the amount of sulfide concentrate in said slurry ranging from about 25 gpl to 500 gpl proportioned at least stoichiometrically to the ammonia concentration of the leaching solution, leaching said sulfide concentrate under substantially ambient pressure while continuously aerating said solution for a time at least sufficient to dissolve said cuprous copper and oxidize said cuprous copper to the cupric state short of oxidizing the contained sulfide sulfur and thereby obtain a pregnant filtrate containing at least about 15% of the total amount of copper in said concentrate and provide a washed residue as a valuable intermediate containing at least about 20% copper by weight comprised substantially of cupric sulfide, contacting said pregnant filtrate with an organic solvent dissolved in water immiscible liquid organic medium to extract copper therefrom and provide a copper-loaded organic solvent and an aqueous ammonia/ammonium sulfate raffinate substantially impoverished in said copper for recycling in the leaching operation, and treating said copper-loaded organic medium with an aqueous sulfuric acid solution to recover the copper as an acid copper sulfate solution of sufficient concentration for the recovery thereof by electrowinning and thereby to regenerate said organic solvent for reuse in the solvent extraction operation.

15. The method of claim 14, wherein the acid copper sulfate solution is subjected to electrowinning to recover substantial amounts of copper therefrom as electrolytically pure copper.

16. The method of claim 14, wherein the leaching is carried out at a temperature of about 20° C. to 40° C.

17. The method of claim 14, wherein the leaching time ranges up to about 2 hours.

18. The method of claim 14, wherein the leaching ranges up to about 1 hour.

* * * * *

UNITED STATES PATENT AND TRADEMARK OFFICE
CERTIFICATE OF CORRECTION

PATENT NO. : 5,176,802
DATED : January 5, 1993
INVENTOR(S) : Willem P.C. Duyvesteyn, et. al.

It is certified that error appears in the above-indentified patent and that said Letters Patent is hereby corrected as shown below:

Claim 1, column 21, line 10, delete "sulfate"--.

Signed and Sealed this

Twenty-second Day of February, 1994

Attest:

BRUCE LEHMAN

*Attesting Officer*   *Commissioner of Patents and Trademarks*